US012080233B2

(12) United States Patent
Dai et al.

(10) Patent No.: US 12,080,233 B2

(45) Date of Patent: Sep. 3, 2024

(54) DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Chao Dai, Hubei (CN); Bo Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/611,559

(22) PCT Filed: Oct. 12, 2021

(86) PCT No.: PCT/CN2021/123303

§ 371 (c)(1),
(2) Date: Mar. 30, 2023

(87) PCT Pub. No.: WO2023/044984

PCT Pub. Date: Mar. 30, 2023

(65) Prior Publication Data

US 2024/0046862 A1 Feb. 8, 2024

(30) Foreign Application Priority Data

Sep. 27, 2021 (CN) .......................... 202111137554.2

(51) Int. Cl.

*G09G 3/3233* (2016.01)
*G09G 3/3266* (2016.01)

(52) U.S. Cl.

CPC ......... *G09G 3/3233* (2013.01); *G09G 3/3266* (2013.01); *G09G 2300/0842* (2013.01); *G09G 2310/08* (2013.01); *G09G 2320/0247* (2013.01)

(58) Field of Classification Search

None

See application file for complete search history.

(56) References Cited

U.S. PATENT DOCUMENTS

2021/0201759 A1* 7/2021 Cho ..................... G09G 3/3233
2021/0201765 A1* 7/2021 Kang ....................... G09G 3/32

(Continued)

FOREIGN PATENT DOCUMENTS

CN 109686301 A 4/2019
CN 112071268 A 12/2020

(Continued)

OTHER PUBLICATIONS

International Search Report in International application No. PCT/CN2021/123303, mailed on Jun. 27, 2022.

(Continued)

*Primary Examiner* — Christopher J Kohlman

(74) *Attorney, Agent, or Firm* — PV IP PC; Wei Te Chung; Zhigang Ma

(57) ABSTRACT

An embodiment of the present application discloses a display panel. A pixel circuit includes a driving transistor, a data writing transistor, a storage capacitor, and a first restoring transistor. A gate electrode of the first restoring transistor is electrically connected to a second scanning line, a source electrode of the first restoring transistor is electrically connected to a first node, and a drain electrode of the first restoring transistor is electrically connected to a first restoring signal source, wherein the first restoring transistor is an (Continued)

oxide transistor, and the driving transistor and the data writing transistor are polysilicon transistors.

9 Claims, 7 Drawing Sheets

(56) References Cited

U.S. PATENT DOCUMENTS

| | | | |
|---|---|---|---|
| 2021/0210005 | A1 | 7/2021 | Zhou et al. |
| 2021/0233468 | A1 | 7/2021 | Toyomura |

FOREIGN PATENT DOCUMENTS

| | | | |
|---|---|---|---|
| CN | 112562588 | A | 3/2021 |
| CN | 112634833 | A | 4/2021 |
| CN | 113140179 | A | 7/2021 |
| CN | 113178170 | A | 7/2021 |
| CN | 113224123 | A | 8/2021 |

OTHER PUBLICATIONS

Written Opinion of the International Search Authority in International application No. PCT/CN2021/123303,mailed on Jun. 27, 2022.

Chinese Office Action issued in corresponding Chinese Patent Application No. 202111137554.2 dated Jul. 12, 2022, pp. 1-6.

* cited by examiner

DISPLAY PANEL

TECHNICAL FIELD

The present application relates to a display field, in particular to a display panel.

BACKGROUND

With development of multimedia, display devices are becoming more and more important. Accordingly, demand for various types of display devices is increasing, particularly in a field of smartphones, where ultra-high frequency drive displays, low power consumption drive displays, and low frequency drive displays are all directions of current and future developments.

Since low-temperature polysilicon (LTPS) has a high mobility and a strong driving capability, a LTPS thin film transistor is widely used in pixel circuits of an organic light-emitting diode (OLED) display device. However, a leakage current of the LTPS thin film transistor is relatively large, especially in low-frequency displays, a voltage of a gate electrode can easily become unstable due to the leakage current being large, so that a potential difference between a gate electrode and a source electrode is unstable, causing a current of the OLED light-emitting element to be unstable, and a flicker phenomenon occurs on the display device.

Therefore, it is necessary to propose a display panel to solve a problem that a pixel circuit using an LTPS thin film transistor has a large leakage current due to the transistor, so that a current of an OLED light-emitting element is unstable, and a flicker phenomenon occurs on the display panel.

TECHNICAL PROBLEMS

An embodiment of the present application provides a display panel, which can solve a problem that a pixel circuit using a polysilicon thin film transistor has a large leakage current, so that a current of an OLED light-emitting element is unstable, and a flicker phenomenon occurs in a display device.

SUMMARY

An embodiment of the present application provides a display panel including a plurality of light-emitting elements disposed in an array and a pixel circuit driving the light-emitting element to emit a light, a first electrode of the light-emitting element is electrically connected to a first power source, a second electrode of the light-emitting element is electrically connected to a second power source, the pixel circuit is coupled between the first power source and the first electrode of the light-emitting element, and the pixel circuit including:

a driving transistor, wherein a gate electrode of the driving transistor is electrically connected to a first node, a source electrode of the driving transistor is electrically connected to a second node, a drain electrode of the driving transistor is electrically connected to a third node, and the first electrode of the light-emitting element is electrically connected to the first power source through the driving transistor;

a data writing transistor, wherein a gate electrode of the data writing transistor is electrically connected to a first scanning line, a source electrode of the data writing transistor is electrically connected to a data line, and a drain electrode of the data writing transistor is electrically connected to the second node;

A storage capacitor including a first capacitor electrode and a second capacitor electrode, wherein the first capacitor electrode is electrically connected to the first power source and the second capacitor electrode is electrically connected to the first node; and a first restoring transistor, wherein a gate electrode of the first restoring transistor is electrically connected to a second scanning line, a source electrode of the first restoring transistor is electrically connected to the first node, and a drain electrode of the first restoring transistor is electrically connected to a first restoring signal source;

wherein the first restoring transistor is an oxide transistor, the driving transistor and the data writing transistor are polysilicon transistors.

Optionally, in some embodiments of the present application, the pixel circuit further includes:

a compensation transistor, wherein a gate electrode of the compensation transistor is electrically connected to the first scanning line, a source electrode of the compensation transistor is electrically connected to the third node, a drain electrode of the compensation transistor is electrically connected to the drain electrode of the first restoring transistor; and a second restoring transistor, wherein a gate electrode of the second restoring transistor is electrically connected to a third scanning line, a source electrode of the second restoring transistor is electrically connected to the drain electrode of the first restoring transistor, and a drain electrode of the second restoring transistor is electrically connected to the first restoring signal source;

wherein the compensation transistor and the second restoring transistor are polysilicon transistors.

Optionally, in some embodiments of the present application, the second restoring transistor and the compensation transistor are a single gate structure.

Optionally, in some embodiments of the present application, the display panel includes a substrate, a first active layer, a first metal layer, a second metal layer, a second active layer, and a third metal layer laminated from a bottom to a top;

the first active layer forms an active layer of a polysilicon transistor, and the second active layer forms an active layer of an oxide transistor;

the first metal layer forms a gate electrode of the polysilicon transistor, and the second metal layer forms a first gate electrode of the oxide transistor;

wherein an overlapping region is defined by an orthographic projection of the first gate electrode of the oxide transistor on the substrate and an orthographic projection of the active layer of the oxide transistor on the substrate; and wherein an overlapping region is defined by an orthographic projection of the gate electrode of the polysilicon transistor on the substrate and an orthographic projection of the active layer of the polysilicon transistor on the substrate.

Optionally, in some embodiments of the present application, the third metal layer forms a second gate of the oxide transistor;

wherein an overlapping region is defined by an orthographic projection of the second gate electrode of the oxide transistor on the substrate and an orthographic projection of the active layer of the oxide transistor on the substrate, and the orthographic projections of the second gate electrode of the oxide transistor and the first gate electrode of the oxide transistor on the substrate at least partially overlap.

Optionally, in some embodiments of the present application, the pixel circuit further includes:

a reset transistor, wherein a gate electrode of the reset transistor is electrically connected to the first scanning line, a source electrode of the reset transistor is electrically connected to a second restoring signal source, a drain electrode of the reset transistor is connected to the first electrode of the light-emitting element;

a first light-emitting control transistor, wherein a gate electrode of the first light-emitting control transistor is electrically connected to a light-emitting control signal line, a source electrode of the first light-emitting control transistor is electrically connected to the first power source, and a drain electrode of the first light-emitting control transistor is electrically connected to the second node; and a second light-emitting control transistor, wherein a gate electrode of the second light-emitting control transistor is electrically connected to the light-emitting control signal line, a source electrode of the second light-emitting control transistor is electrically connected to the third node, and a drain electrode of the second light-emitting control transistor is electrically connected to the first electrode of the light-emitting element.

Optionally, in some embodiments of the present application, the reset transistor, the first light-emitting control transistor, and the second light-emitting control transistor are all polysilicon transistors.

Optionally, in some embodiments of the present application, the polysilicon transistor is a P-type transistor, and the oxide transistor is an N-type transistor.

Optionally, in some embodiments of the present application, the first restoring signal source and the second restoring signal source are a same restoring signal source.

Optionally, in some embodiments of the present application, the first scanning line and the second scanning line are scanning lines of a current row, and the third scanning line is a scanning line of a previous row.

BENEFICIAL EFFECTS

In an embodiment of the present application, a display panel is provided, which can reduce a magnitude of a leakage current of a pixel circuit using a polysilicon thin film transistor, thereby making a current of an OLED light-emitting element more stable, and improving a flicker phenomenon occurring on the display panel.

BRIEF DESCRIPTION OF THE DRAWINGS

In order to more clearly illustrate the technical solutions in the embodiments of the present application, the accompanying drawings required for use in the description of the embodiments will be briefly described below. It will be apparent that the accompanying drawings in the following description are merely some embodiments of the present application, and other drawings may be obtained from these drawings without creative effort by those skilled in the art.

DETAILED DESCRIPTION OF EMBODIMENTS

Figure 1:
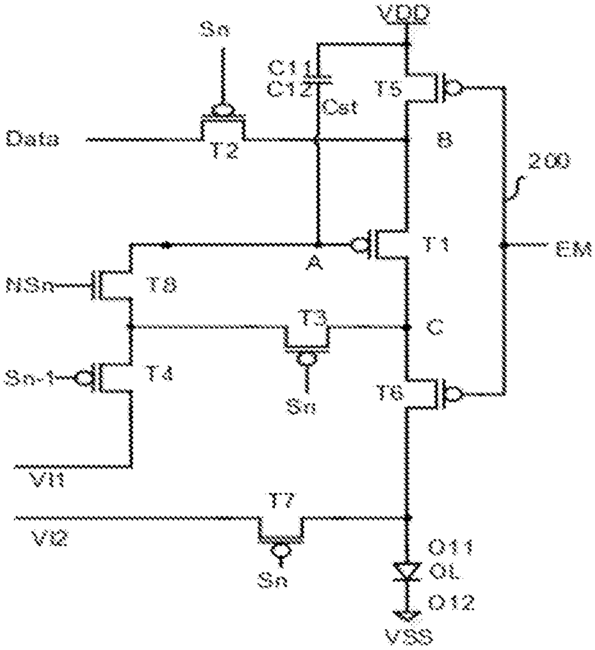
FIG. 1 is a schematic diagram of an equivalent circuit of a pixel circuit on a display panel according to an embodiment of the present application.

The following describes the technical solutions of the embodiments of the present application in a clear and complete manner with reference to the accompanying drawings in the embodiments of the present application. It will be apparent that the described embodiments are only a part of the embodiments of the present application, but not all of the embodiments. Based on the embodiments of the present application, all other embodiments obtained by those skilled in the art without creative effort fall within the scope of the present application. Furthermore, it should be understood that the specific embodiments described herein are intended only to illustrate and explain the present application and are not intended to limit the present application. And terms of directions "up" and "down" are used in the present application in the absence of a reverse description, generally referring to the upper and lower parts of the device in actual use or operation, in particular in the drawing direction. And terms "in" and "out" are for the profile of the device.

An embodiment of the present application provides a display panel including a plurality of light-emitting elements disposed in an array and a pixel circuit for driving the light-emitting elements to emit light. A first electrode of the light-emitting element is electrically connected to a first power source, a second electrode of the light-emitting element is electrically connected to a second power source, and a pixel circuit is coupled between the first power source and the first electrode of the light-emitting element. The pixel circuit includes: a driving transistor, a gate electrode of the driving transistor electrically connected to a first node, a source electrode of the driving transistor electrically connected to a second node, a drain electrode of the driving transistor electrically connected to a third node, and a first electrode of the light-emitting element electrically connected to the first power source through the driving transistor; a data writing transistor, a gate electrode of the data writing transistor electrically connected to a first scanning line, a source electrode of the data writing transistor electrically connected to a data line, and a drain electrode of the data writing transistor electrically connected to the second node; a storage capacitor including a first capacitor electrode and a second capacitor electrode, the first capacitor electrode electrically connected to the first power source, and the second capacitor electrode electrically connected to the first node; and a first restoring transistor, a gate electrode of the first restoring transistor electrically connected to the second scanning line, a source electrode of the first restoring transistor electrically connected to the first node, and a drain electrode of the first restoring transistor electrically connected to a first restoring signal source, wherein the first restoring transistor is an oxide transistor, and the driving transistor and the data writing transistor are polysilicon transistors.

An embodiment of the present application provides a display panel. Detailed description will be given below. It should be noted that the order of description of the following embodiments is not a limitation on the preferred order of the embodiments.

Example 1

Figure 2:
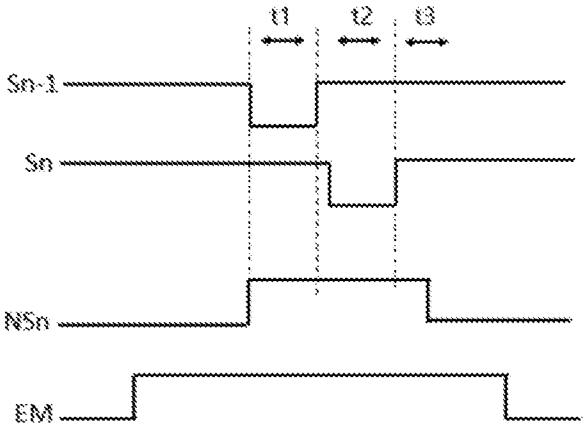
FIG. 2 is a timing diagram of an equivalent circuit of a pixel circuit on a display panel according to an embodiment of the present application.
Figure 3:
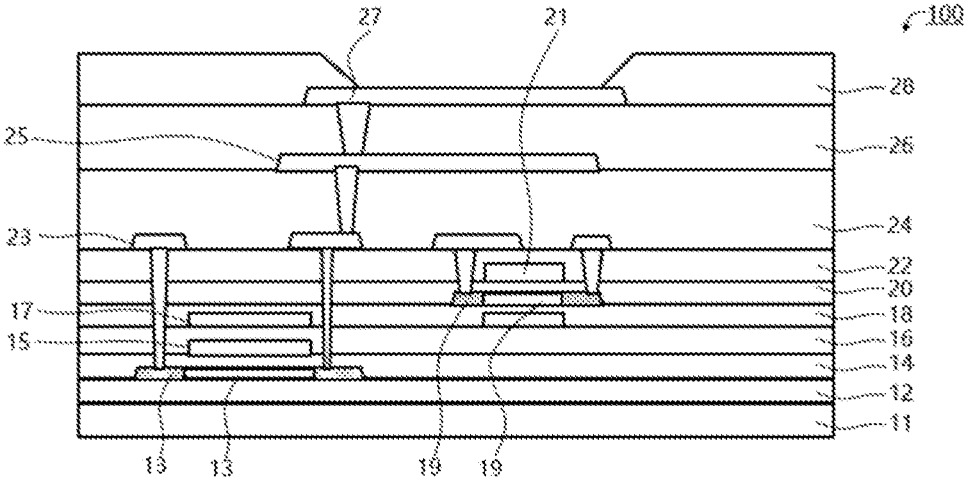
FIG. 3 is a cross-sectional schematic diagram of a film layer structure of a pixel circuit on a display panel according to an embodiment of the present application.
Figure 4:
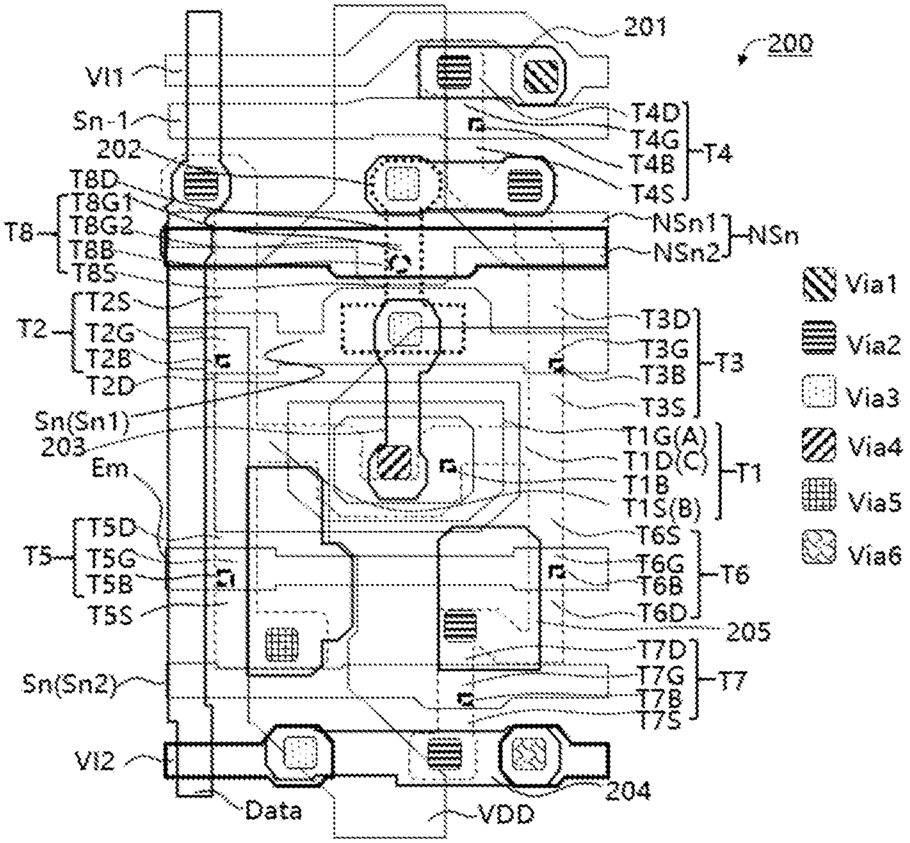
FIG. 4 is a schematic diagram of an arrangement of a pixel circuit layout on the display panel according to an embodiment of the present application.

References are made to FIG. 1, FIG. 2, FIG. 3, and FIG. 4, wherein FIG. 1 is a schematic diagram of an equivalent circuit of a pixel circuit on a display panel according to an embodiment of the present application, FIG. 2 is a timing diagram of an equivalent circuit of a pixel circuit on a display panel according to an embodiment of the present application; FIG. 3 is a cross-sectional schematic diagram of a film layer structure of a pixel circuit on a display panel according to an embodiment of the present application; and FIG. 4 is a schematic diagram of an arrangement of a pixel circuit layout on a display panel according to an embodiment of the present application.

A display panel 100 provided by the embodiment of the present application includes a plurality of light-emitting elements OL disposed in an array and a pixel circuit 200 for driving the light-emitting element OL to emit a light. A first electrode O11 of the light-emitting element OL is electrically connected to a first power source VDD, and a second electrode O12 of the light-emitting element OL is electrically connected to a second power source VSS. The pixel circuit 200 is coupled between the first power source VDD and the first electrode O11 of the light-emitting element OL, and the pixel circuit 200 includes a driving transistor T1, a data writing transistor T2, a storage capacitor Cst, and a first restoring transistor T8.

A gate electrode T1G of the driving transistor T1 is electrically connected to a first node A, a source electrode T1S of the driving transistor T1 is electrically connected to a second node B, a drain electrode T1D of the driving transistor T1 is electrically connected to a third node C, and the first electrode O11 of the light-emitting element OL is electrically connected to the first power source VDD through the driving transistor T1.

A gate electrode T2G of the data writing transistor T2 is electrically connected to a first scanning line Sn, a source electrode T2S of the data writing transistor T2 is electrically connected to a data line Data, and a drain electrode of T2D of the data writing transistor T2 is electrically connected to the second node B.

The storage capacitor Cst includes a first capacitor electrode C11 and a second capacitor electrode C12, the first capacitor electrode C11 is electrically connected to the first power source VDD, and the second capacitor electrode C12 is electrically connected to the first node A.

A gate electrode T8G of the first restoring transistor T8 is electrically connected to a second scanning line NSn, a source electrode T8S of the first restoring transistor T8 is electrically connected to the first node A, and a drain electrode T8D of the first restoring transistor T8 is electrically connected to a first restoring signal source VI1.

The first restoring transistor T8 is an oxide transistor, and the driving transistor T1 and the data writing transistor T2 are polysilicon transistors.

Further, the pixel circuit 200 further includes a compensation transistor T3 and a second restoring transistor T4.

A gate electrode T3G of the compensation transistor T3 is electrically connected to the first scanning line Sn, a source electrode T3S of the compensation transistor T3 is electrically connected to the third node C, and a drain electrode T3D of the compensation transistor T3 is electrically connected to the drain electrode T8D of the first restoring transistor T8.

A gate electrode T4G of the second restoring transistor T4 is electrically connected to a third scanning line Sn−1, a source electrode T4S of the second restoring transistor T4 is electrically connected to the drain electrode T8D of the first restoring transistor T8, and a drain electrode T4D of the second restoring transistor T4 is electrically connected to the first restoring signal source VI1.

Wherein, the compensation transistor T3 and the second restoring transistor T4 are polysilicon transistors.

Further, the display panel 100 includes a substrate 11, a first active layer 13, a first metal layer 15, a second metal layer 17, a second active layer 19, and a third metal layer 21 which are laminated from bottom to top.

The first active layer 13 forms an active layer of a polysilicon transistor, and the second active layer 19 forms an active layer of an oxide transistor.

The first metal layer 15 forms a gate electrode of the polysilicon transistor, and the second metal layer 17 forms a first gate electrode of the oxide transistor.

Specifically, the first metal layer 15 forms the gate electrode of the polysilicon transistor, that is, the first metal layer 15 forms a top gate electrode of the polysilicon transistor. The second metal layer 17 forms the first gate electrode of the oxide transistor, that is, the second metal layer 17 forms a bottom gate electrode of the oxide transistor.

An orthographic projection of the first gate electrode of the oxide transistor on the substrate 11 and an orthographic projection of the active layer of the oxide transistor on the substrate 11 have an overlapping region.

An orthographic projection of the gate electrode of the polysilicon transistor on the substrate 11 and an orthographic projection of the active layer of the polysilicon transistor on the substrate 11 have an overlapping region.

Further, the structure of the display panel 100 further includes:

- a third metal layer 21 forming a second gate electrode of the oxide transistor;

wherein an orthographic projection of the second gate electrode of the oxide transistor on the substrate 11 and an orthographic projection of the active layer of the oxide transistor on the substrate 11 have an overlapping region, and an orthographic projection of the second gate electrode of the oxide transistor and an orthographic projection of the first gate electrode of the oxide transistor on the substrate at least partially are overlapped.

Specifically, the third metal layer 21 forms the second gate electrode of the oxide transistor, that is, the third metal layer 21 forms a top gate electrode of the oxide transistor.

Further, the pixel circuit 200 further includes a reset transistor T7, a first light-emitting control transistor T5, and a second light-emitting control transistor T6.

A gate electrode T7G of the reset transistor T7 is electrically connected to the first scanning line Sn, a source electrode T7S of the reset transistor T7 is electrically connected to a second restoring signal source VI2, and a drain electrode T7D of the reset transistor T7 is electrically connected to the first electrode O11 of the light-emitting element OL.

A gate electrode T5G of the first light-emitting control transistor T5 is electrically connected to a light-emitting control signal line EM, a source electrode T5S of the first light-emitting control transistor T5 is electrically connected to the first power source VDD, and a drain electrode T5D of the first light-emitting control transistor T5 is electrically connected to the second node B.

A gate electrode T6G of the second light-emitting control transistor T6 is electrically connected to the light-emitting control signal line EM, a source electrode T6S of the second light-emitting control transistor T6 is electrically connected to the third node C, and a drain electrode T6D of the second light-emitting control transistor T6 is electrically connected to the first electrode O11 of the light-emitting element OL.

Further, the reset transistor T7, the first light-emitting control transistor T5, and the second light-emitting control transistor T6 are all polysilicon transistors.

Further, the polysilicon transistor is a P-type transistor. The oxide transistor is an N-type transistor.

Further, the first restoring signal source VI1 and the second restoring signal source VI2 are a same restoring signal source.

Further, the first scanning line Sn and the second scanning line NSn are scanning lines of a current row, and the third scanning line Sn−1 is a scanning line of a previous row.

Further, the second restoring transistor T4 and the compensation transistor T3 have a single gate structure.

Specifically, the second restoring transistor T4 has only one gate electrode on a side of the active layer and the compensation transistor T3 has only one gate electrode on a side of the active layer. The second restoring transistor T4 and the compensation transistor T3 have a single gate structure.

In some embodiments, the driving transistor T1, the data writing transistor T2, the first restoring transistor T8, the compensation transistor T3, the second restoring transistor T4, the reset transistor T7, the first light-emitting control transistor T5, and the second light-emitting control transistor T6 all have a single gate structure, that is, only one gate electrode on a side of the respective active layer.

Next, the structure and connection relationship of the above-described embodiment will be further described.

The first restoring signal source VI1 and the second restoring signal source VI2 may separately supply signals for two separate signal lines. At this time, a first restoring signal of the first restoring signal source VI1 is supplied to the first node A through the first restoring transistor T8 and the second restoring transistor T4, and a second restoring signal is supplied to the first electrode O11 of the light-emitting element OL through the reset transistor T7. The first restoring signal is different from the second restoring signal. The first node A and the first electrode O11 of the light-emitting element OL separately are supplied with different restoring signals to prevent the restoring signal of the first node A from interfering with the restoring signal of the first electrode O11 of the light-emitting element OL, which can improve the luminous efficiency and brightness of the light-emitting element OL.

The first restoring signal source VI1 and the second restoring signal source VI2 may be a same restoring signal source, and the first node A and the first electrode O11 of the light-emitting element OL are supplied with a same restoring signal, so that a number of traces may be reduced.

The first scanning line Sn and the second scanning line NSn are scanning lines of a current row which indicate that a row n of pixels includes the first scanning line Sn and the second scanning line NSn, A third scanning line Sn−1 is a scanning line of a previous row which indicates that a row n−1 of pixels includes a first scanning line Sn−1 of the previous row and a second scanning line NSn−1 of the previous row, that is, the first scanning line Sn−1 of the previous row is the third scanning line Sn−1 of the row n of pixels.

Sn denotes a scanning line of pixels of the row n, and a scanning line signal supplied to the polysilicon transistor. NSn denotes a scanning line of pixels of the row n, and a scanning line signal supplied to the oxide transistor.

Referring continuously to FIG. 1, FIG. 2, and FIG. 3, an operation of a pixel circuit 200 will be described with reference to FIG. 1, FIG. 2, and FIG. 3. The first restoring transistor T8 is an oxide transistor, and a material of the active layer of the oxide transistor is an oxide semiconductor, such as IGZO (indium gallium zinc oxide). The compensation transistor T3, the second restoring transistor T4, the driving transistor T1, the data writing transistor T2, the reset transistor T7, the first light-emitting control transistor T5, and the second light-emitting control transistor T6 are all polysilicon transistors. The material of the active layer of the polysilicon transistor is polysilicon, such as low-temperature polysilicon (LTPS).

In a restore stage t1, a signal of the first scanning line Sn and a signal of the second scanning line NSn are at a high potential, a signal of the third scanning line Sn−1 is at a low potential, and a signal of the light-emitting control signal line EM is at a high potential. The driving transistor T1, the data writing transistor T2, the compensation transistor T3, the reset transistor T7, the first light-emitting control transistor T5, the second light-emitting control transistor T6 are turned off, the first restoring transistor T8 and the second restoring transistor T4 are turned on, and the first restoring signal source supplies the first restoring signal to the first node A.

In a data writing stage t2, the signal of the first scanning line Sn is at a low potential, the signal of the second scanning line NSn and the signal of the third scanning line Sn−1 are at a high potential, the signal of the light-emitting control signal line EM is at a high potential, the compensation transistor T3 and the first restoring transistor T8 are turned on, turning on the gate electrode T1G and the drain electrode T1D of the driving transistor T1, and a voltage difference is generated between the gate electrode T1G and the source electrode T1S of the driving transistor T1 by a threshold voltage of the driving transistor T1. At this time, the driving transistor T1 is turned on, the data writing transistor T2 is turned on, and a data signal of the data line Data is inputted to the second node B. The data signal of the data line Data includes a compensated threshold voltage and is inputted to the gate electrode T1G of the driving transistor T1, thereby compensating a threshold voltage deviation of the driving transistor T1. The data signal of the data line Data written charges the first node A through the driving transistor T1 until the voltage of the first node A becomes Vdata-Vth, and the driving transistor T1 is turned off. Further, the reset transistor T7 is turned on, and the second restoring signal source VI2 supplies the second restoring signal to the first electrode O11 of the light-emitting element OL.

In a light-emitting stage t3, the signal of the first scanning line Sn and the signal of the third scanning line Sn−1 are at a high potential, the signal of the second scanning line NSn is at a low potential, the potential of the light-emitting control signal line EM is at a low potential, the data writing transistor T2, the compensation transistor T3, the first restoring transistor T8, the second restoring transistor T4, and the reset transistor T7 are turned off, the first light-emitting control transistor T5 and the second light-emitting control transistor T6 are turned on, the driving transistor T1 remains in an on state, and the signal of the first power source VDD flows to the light-emitting element OL, at which time the light-emitting element OL emits light.

In some embodiments, the first electrode O11 and the second electrode O12 of the light-emitting element OL may be an anode and a cathode, respectively.

In the embodiment of the present application, the first restoring transistor T8 is an oxide transistor. Specifically, an orthographic projection of the second gate electrode of the oxide transistor on the substrate 11 and an orthographic projection of the active layer of the oxide transistor on the substrate 11 have an overlapping region, the second active layer 19 forms the active layer of the oxide transistor, and the second active layer 19 is a metal oxide active layer.

In the embodiment of the present application, the compensation transistor T3, the second restoring transistor T4, the driving transistor T1, the data writing transistor T2, the reset transistor T7, the first light-emitting control transistor T5, and the second light-emitting control transistor T6 are all polysilicon transistors. Specifically, an orthographic projection of the gate electrode of the polysilicon transistor on the substrate 11 and an orthographic projection of the active layer of the polysilicon transistor on the substrate 11 have an overlapping region, and the first active layer 13 forms the active layer of the polysilicon transistor. Further, the third metal layer 21 forms a second gate electrode of the oxide transistor, wherein an orthographic projection of the second gate electrode of the oxide transistor on the substrate 11 and an orthographic projection of the active layer of the oxide transistor on the substrate 11 have an overlapping region, and the orthographic projection of the second gate electrode of the oxide transistor and an orthographic projection of the first gate electrode of the oxide transistor on the substrate at least partially overlaps.

In the embodiment of the present application, the first restoring transistor T8 is an oxide transistor, and the metal oxide semiconductor is used as the active layer, so that the leakage current of the pixel circuit can be reduced, making a current of the light-emitting element OL more stable, and the flicker phenomenon of the display device can be avoided. The second restoring transistor T4 and the compensation transistor T3 adopt a single gate structure, which can avoid a bloated layout of the pixel circuit 200, reducing a layout space occupied by the pixel circuit 200 on the display panel 100, and improving a resolution of the display device. The compensation transistor T3, the second restoring transistor T4, the driving transistor T1, the data writing transistor T2, the reset transistor T7, the first light-emitting control transistor T5, and the second light-emitting control transistor T6 are all polysilicon transistors, which can increase a charge transfer rate in the pixel circuit and a charging capability of the pixel circuit. Further, the compensation transistor T3, the first restoring transistor T8, the second restoring transistor T4, the driving transistor T1, the data writing transistor T2, the reset transistor T7, the first light-emitting control transistor T5, and the second light-emitting control transistor T6 all have a single-gate structure. Therefore, the layout of the pixel circuit 200 can be further simplified, and the layout space occupied by the pixel circuit 200 on the display panel 100 can be further reduced, thereby facilitating to improve the resolution of the display device. The resolution of the display device increases 8% as verified through the experimentation.

Example 2

The embodiment of the present application further describes the display panel 100 and the pixel circuit 200 in the above-described embodiment in detail.

Figure 5:
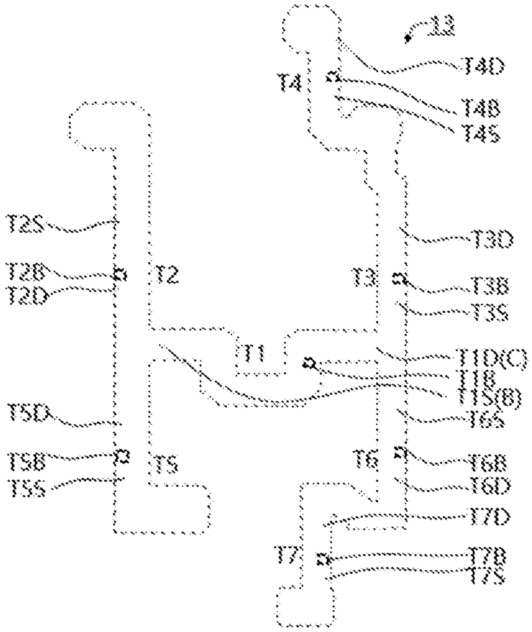
FIG. 5 is a schematic diagram of a pattern of a first active layer in the pixel circuit layout according to an embodiment of the present application.
Figure 6:
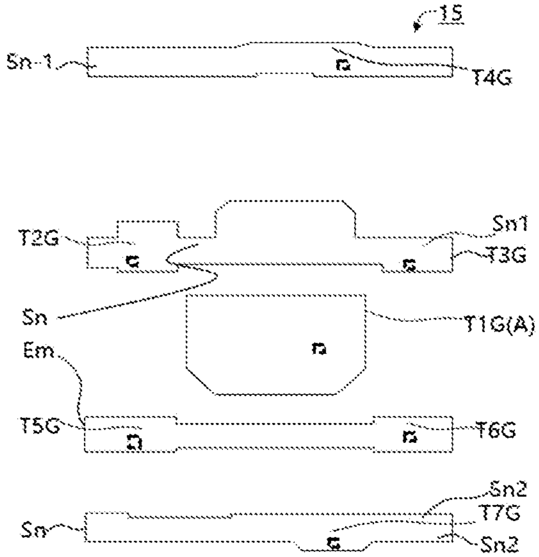
FIG. 6 is a schematic diagram of a pattern of a first metal layer in the pixel circuit layout according to an embodiment of the present application.
Figure 7:
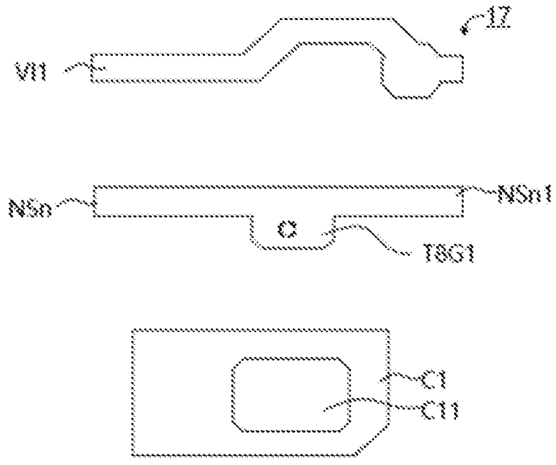
FIG. 7 is a schematic diagram of a pattern of a second metal layer in the pixel circuit layout according to an embodiment of the present application.
Figure 8:
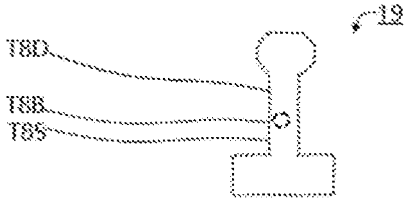
FIG. 8 is a schematic diagram of a pattern of a second active layer in the pixel circuit layout according to an embodiment of the present application.
Figure 9:
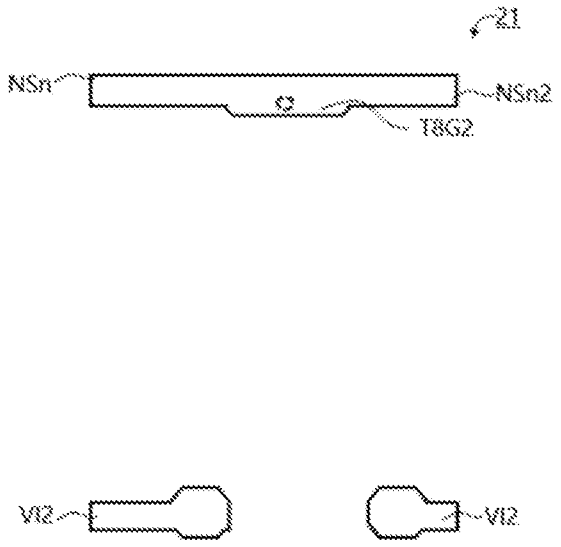
FIG. 9 is a schematic diagram of a pattern of a third metal layer in the pixel circuit layout according to an embodiment of the present application.
Figure 10:
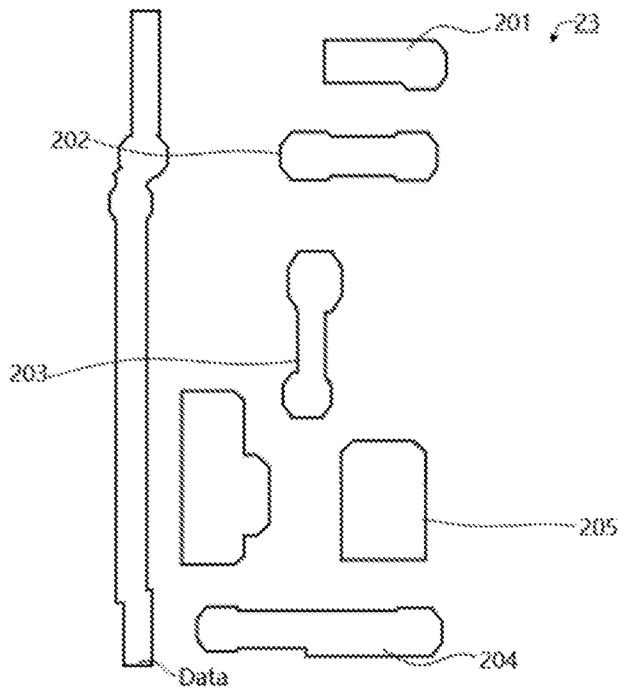
FIG. 10 is a schematic diagram of a pattern of a fourth metal layer in the pixel circuit layout according to an embodiment of the present application.
Figure 11:
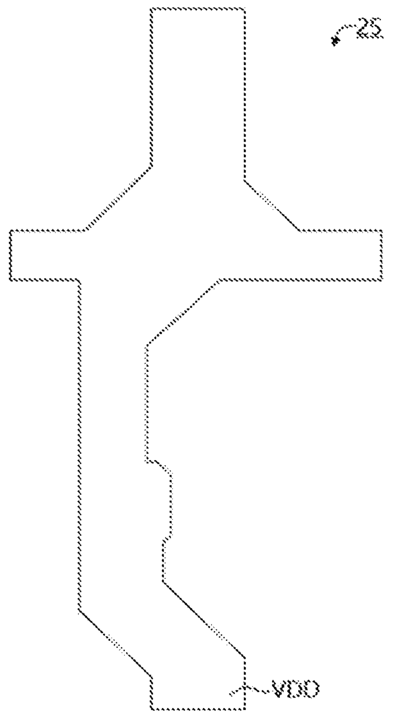
FIG. 11 is a schematic diagram of a pattern of a fifth metal layer in the pixel circuit layout according to an embodiment of the present application.
Figure 12:
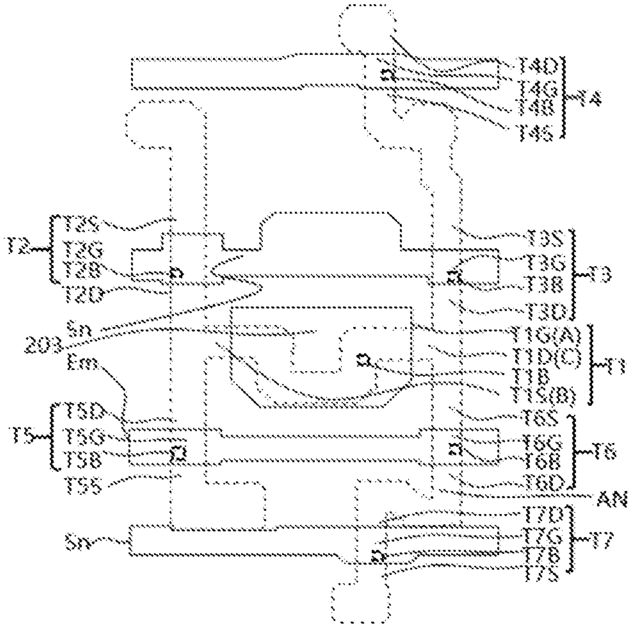
FIG. 12 is a schematic diagram of a stacked structure of the first active layer to the first metal layer in the pixel circuit layout according to an embodiment of the present application.
Figure 13:
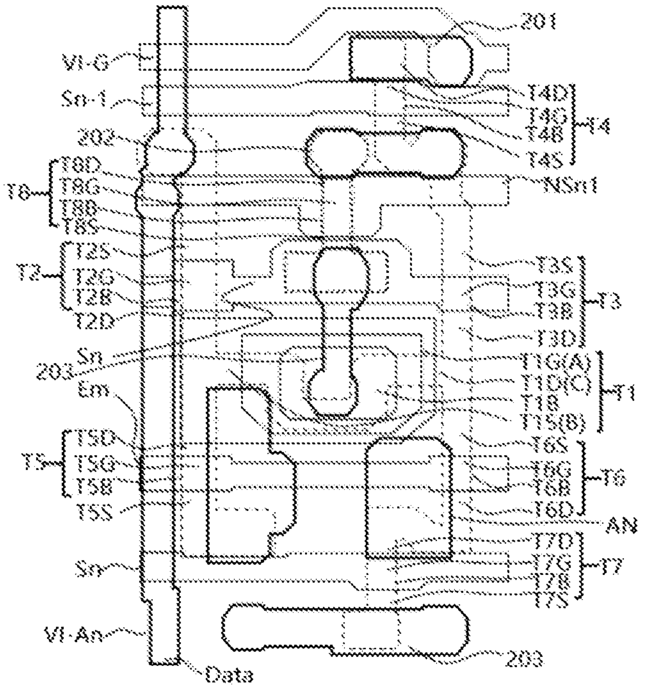
FIG. 13 is a schematic diagram of a stacked structure of the first active layer to the fourth metal layer in the pixel circuit layout according to an embodiment of the present application.

References are made to FIG. 3, FIG. 4, FIG. 5, FIG. 6, FIG. 7, FIG. 9, FIG. 10, FIG. 11, FIG. 12, and FIG. 13, wherein FIG. 5 a schematic diagram of a pattern of a first active layer in the pixel circuit layout according to an embodiment of the present application, FIG. 6 is a schematic diagram of a pattern of a first metal layer in the pixel circuit layout according to an embodiment of the present application, FIG. 7 is a schematic diagram of a pattern of a second metal layer in the pixel circuit layout according to an embodiment of the present application, FIG. 8 is a schematic diagram of a pattern of a second active layer in the pixel circuit layout according to an embodiment of the present application, FIG. 9 is a schematic diagram of a pattern of a third metal layer in the pixel circuit layout according to an embodiment of the present application, FIG. 10 is a schematic diagram of a pattern of a fourth metal layer in the pixel circuit layout according to an embodiment of the present application, FIG. 11 is a schematic diagram of a pattern of a fifth metal layer in the pixel circuit layout according to an embodiment of the present application, FIG. 12 is a schematic diagram of a stacked structure of the first active layer to the first metal layer in the pixel circuit layout according to an embodiment of the present application, and FIG. 13 is a schematic diagram of a stacked structure of the first active layer to the fourth metal layer in the pixel circuit layout according to an embodiment of the present application.

In some embodiments, referring to FIGS. 2 and 4, the pixel circuit 200 is disposed on the display panel 100. The layer structure of the display panel 100 may be as follows, but is not limited to the number and order of the layer structures as follows. The layer structure of the display panel 100 includes: a substrate 11; a buffer layer 12 disposed on the substrate 11, and a first active layer 13 disposed on the buffer layer 12; a first gate insulating layer 14 disposed on the first active layer 13; a first metal layer 15 disposed on the first gate insulating layer 14; a capacitive insulating layer 16 disposed on the first metal layer 15; a second metal layer 17 disposed on the capacitive insulating layer 16; a second gate insulating layer 18 disposed on the second metal layer 17; a second active layer 19 disposed on the second gate insulating layer 18; a third gate insulating layer 20 disposed on the second active layer 19; a third metal layer 21 disposed on the third gate insulating layer 20; an interlayer insulating layer 22 disposed on the third metal layer 21; a fourth metal layer 23 disposed on the interlayer insulating layer 22; a first flat layer 24 disposed on the fourth metal layer 23; a fifth metal layer 25 disposed on the first flat layer 24; a second flat layer 26 disposed on the fifth metal layer 25; an anode 27 disposed on the second flat layer; and a pixel defining layer 28 is disposed on the anode 27.

Referring to FIG. 3, FIG. 4, FIG. 5, and FIG. 12, the first active layer 13 includes an active layer T1B, a source electrode T1S, and a drain electrode T1D of the driving transistor T1; the first active layer 13 includes an active layer T2B, a source electrode T2S, and a drain electrode T2D of the data writing transistor T2; the first active layer 13 includes an active layer T3B, a source electrode T3S, and a drain electrode T3D of the compensation transistor T3; the first active layer 13 includes an active layer T4B, a source electrode T4S, and a drain electrode T4D of the second restoring transistor T4; the first active layer 13 includes an active layer T5B, a source electrode T5S, and a drain electrode T5D of the first light-emitting control transistor T5; the first active layer 13 includes an active layer T6B, a source electrode T6S, and a drain electrode T6D of the second light-emitting control transistor T6, and the first active layer 13 includes an active layer T7B, a source electrode T7S, and a drain electrode T7D of the reset transistor T7. The active layers of the respective transistors are connected to each other, and materials of first active layers of different transistors are conductive so as to serve as traces or electrodes of the source electrode or the drain electrode for electrical connection.

Referring to FIG. 3, FIG. 4, FIG. 6, and FIG. 12, the first metal layer includes a first scanning line Sn, a third scanning line Sn−1, a light-emitting control signal line EM, and a gate electrode T1G of a driving transistor T1. The first scanning line Sn includes a first sub-scanning line Sn1 and a second sub-scanning line Sn2. A gate electrode T2G of a data writing transistor T2 and a gate electrode T3G of a compensation transistor T3 are a part of the first sub-scanning line Sn1, a gate electrode T7G of a reset transistor T7 is a part of the second sub-scanning line Sn2, a gate electrode T5G of a first light-emitting control transistor T5 and a gate electrode T6G of a second light-emitting control transistor T6 are a part of the light-emitting control signal line EM, a gate electrode T4G of a second restoring transistor T4 is a part of the third scanning line Sn−1, and a gate electrode T1G of the driving transistor T1 is multiplexed as a second capacitor electrode C12 of a storage capacitor Cst. That is, the first metal layer 15 is patterned to form a gate electrode of the polysilicon transistor.

Referring to FIG. 3, FIG. 4, and FIG. 7, the second metal layer 17 includes a trace of a first restoring signal source VI1, a third sub-scanning line NSn1 of a second scanning line NSn, and a first capacitor electrode C11 of the storage capacitor Cst. A first gate electrode T8G1 of a first restoring transistor T8 is a part of the third sub-scanning line NSn1. That is, the second metal layer 17 is patterned to form a first gate electrode of the oxide transistor.

Referring to FIG. 3, FIG. 4, and FIG. 8, the second active layer 19 includes an active layer T8B, a source electrode T8S and a drain electrode T8D of the first restoring transistor T8.

Referring to FIG. 3, FIG. 4, and FIG. 9, the third metal layer includes a trace of a fourth sub-scanning line NSn2 of the second scanning line NSn and a second restoring signal source VI2, the second scanning line NSn includes the third sub-scanning line NSn1 and the fourth sub-scanning line NSn2, and a top gate electrode T8G2 of the first restoring transistor T8 is a part of the fourth sub-scanning line NSn2. At this time, the gate electrode of the first restoring transistor T8 includes the bottom electrode T8G1 and the top gate electrode T8G2. That is, the third metal layer 21 is patterned to form a second gate electrode of the oxide transistor.

Referring to FIG. 3, FIG. 4, and FIG. 10, the fourth metal layer 23 includes a data line Data, a first connection electrode 201, a second connection electrode 202, a third connection electrode 203, a fourth connection electrode 204, and a fifth connection electrode 205. The first connection electrode 201, the second connection electrode 202, the third connection electrode 203, the fourth connection electrode 204, and the fifth connection electrode 205 functions to transmitting a signal, and the detailed transmitting phases will be described below.

Referring to FIG. 3, FIG. 4, and FIG. 11, the fifth metal layer 25 includes a trace of the first power source VDD.

Referring to FIG. 1, FIG. 2, and FIG. 4, the current path of the pixel circuit 200 and the light-emitting element OL on the display panel 100 will be described below. The display panel 100 includes a first via Via1, a second via Via2, a third via Via3, a fourth via Via4, a fifth via Via5, and a sixth via Via6. The second metal layer 17 and the fourth metal layer 23 are connected through the first via Via1, the fourth metal layer 23 and the first active layer 13 are connected through the second via Via2, the fourth metal layer 23 and the second active layer 19 are connected through the third via Via3, the fourth metal layer 23 and the first metal layer 15 are connected through the fourth via Via4, the fifth metal layer 25 and the first active layer 13 are connected through the fifth via Via5, and the third metal layer 21 and the fourth metal layer 23 are connected through the sixth via Via6.

In the restore stage t1, the first restoring transistor T8 and the second restoring transistor T4 are turned on, and the first restoring signal source VI1 supplies the first node A with a first restoring signal. The current path includes: the trace of the first restoring signal source VI2, formed by patterning the second metal layer 17, transmits the signal through the first via Via1 to the first connection electrode 201, formed by patterning the fourth metal layer 23; the first connection electrode 201 transmits the signal through the second via to the drain electrode T4D of the second restoring transistor T4 in the first active layer 13; the signal passes the active layer T4B of the second restoring transistor T4 to the source electrode T4S; the source electrode T4S of the second restoring transistor T4 transmits the signal to the second connection electrode 202, formed by pattering the fourth metal layer 23, through the second via Via2; the second connection electrode 202 transmits the signal to the drain electrode T8D of the first restoring transistor T8 through the third via Via3; the signal passes through the active layer T8B of the first restoring transistor T8 to the source electrode T8S; the source electrode T8S of the first restoring transistor T8 transmits the signal to the third connection electrode 203, formed by pattering the fourth metal layer 23, through the third via Via3; and the third connection electrode 203 transmits the signal to the first node A (second capacitor electrode C12) through the fourth via Via4.

In the data writing stage t2, the driving transistor T1, the data writing transistor T2, the compensation transistor T3, and the first restoring transistor T8 are turned on, the data signal of the data line Data is inputted to the second node B, and the signal is transferred to the first node A. The current path includes: the data line Data formed by patterning the fourth metal layer 23 transfers the signal to the first active layer 13 through the second via Via2, the signal reaches the source electrode (or second node) of the driving transistor T1 through the source electrode T2S, the active layer T2B, and the drain electrode T2D of the data writing transistor T2; the signal passes the driving transistor T1 and reaches the source electrode T3S of the compensation transistor T3, the signal reaches the drain electrode T3D of the compensation transistor T3 through the active layer T3B of the compensation transistor T3, the signal passes from the drain electrode T3D of the compensation transistor T3 through the second via Via2 to the second connection electrode 202 formed by patterning the fourth metal layer 23, the signal is transmitted from the second connection electrode 202 to the drain electrode T8D of the first restoring transistor T8 through the third via Via3, the signal reaches the source electrode T8S through the active layer T8B of the first restoring transistor T8, the signal passes from the source electrode T8S of the first restoring transistor T8 to the fourth metal layer 23 formed by patterning the third connection electrode 203 through the third via Via3, and the signal passes from the third connection electrode 203 to the first node A (second capacitor C12) through the fourth via Via4. Further, the reset transistor T7 is turned on and the second restoring signal source VI2 supplies the first electrode O11 of the light-emitting element OL with the second restoring signal. The current path thereof includes that the second restoring signal source VI2 formed by patterning the third metal layer 21 passes to the fourth connection electrode 204 formed by patterning the fourth metal layer 23 through the sixth via, the signal passes from the fourth connection electrode 204 to the source electrode T7S of the reset transistor T7 through the second via, the signal is sequentially passed through the source electrode T7S, the active layer T7B, the drain electrode T7D of the reset transistor T7, and then the signal passes from the drain electrode T7D of the reset transistor T7 to the fifth connection electrode 205 formed by patterning the fourth metal layer 23 through the second via Via2, and the fifth connection electrode 205 is electrically connected to the first electrode O11 of the light-emitting element OL.

In the light-emitting stage t3, the first light-emitting control transistor T5 and the second light-emitting control transistor T6 are turned on, the driving transistor T1 remains in an on state, and the signal of the first power source VDD flows toward the light-emitting element OL. At this time, the light-emitting element OL emits light. The current path includes the trace of the first power source VDD formed by patterning the fifth metal layer 25 transmits the signal to the source electrode T5S of the first light-emitting control transistor T5 through the fifth via Aia5, the signal passes the drain electrode T5D of the first light-emitting control transistor T5 to the source electrode (or second node) of the driving transistor T1, the signal passes the driving transistor T1 to the source electrode T6S of the second light-emitting control transistor T6, the signal passes to the drain electrode T6D of the second light-emitting control transistor T6, the signal passes from the drain electrode T6D of the second light-emitting control transistor T6 through the second via Via2 to the fifth connection electrode 205 formed by patterning the fourth metal layer 23, and the fifth connection electrode 205 is electrically connected to the first electrode O11 of the light-emitting element OL.

Referring to FIG. 4, in the embodiment of the present application, the first restoring transistor T8 is an oxide transistor, and the metal oxide semiconductor is used as the active layer, so that the leakage current of the pixel circuit can be reduced, making a current of the light-emitting element OL more stable, and the flicker phenomenon of the display device can be avoided. The second restoring transistor T4 and the compensation transistor T3 adopt a single gate structure, which can avoid a bloated layout of the pixel circuit 200, reduce the layout space occupied by the pixel circuit 200 on the display panel 100, and improve the resolution of the display device. The compensation transistor T3, the second restoring transistor T4, the driving transistor T1, the data writing transistor T2, the reset transistor T7, the first light-emitting control transistor T5, and the second light-emitting control transistor T6 are all polysilicon transistors, which can increase the charge transfer rate in the pixel circuit and the charge capability of the pixel circuit. Further, the compensation transistor T3, the first restoring transistor T8, the second restoring transistor T4, the driving transistor T1, the data writing transistor T2, the reset transistor T7, the first light-emitting control transistor T5, and the second light-emitting control transistor T6 all have a single-gate structure. Therefore, the layout of the pixel circuit 200 can be further simplified, and the layout space occupied by the pixel circuit 200 on the display panel 100 can be further reduced, thereby facilitating to improve the resolution of the display device.

Example 3

An embodiment of the present application further provides a display device including the display panel 100 described in any one of the above embodiments. The display device further includes a support layer disposed on the back side of the display panel, and a protective layer disposed on the front side of the display panel. The display panel may further include an encapsulation layer covering the surface of the light-emitting element OL.

It should be noted that the single gate structure in the embodiment of the present application means that only one of a bottom gate and a top gate exists, and there is only one gate electrode when the bottom gate exists, or there is only one gate electrode when the top gate exists. For example, in some embodiments, the second restoring transistor T4 and the compensation transistor T3 have a single gate structure, that is, the second restoring transistor T4 has only one top gate of the gate electrode T4G, and the compensation transistor T3 has only one top gate of the gate electrode T3G. In the prior art, some transistors have a plurality of top gates or a plurality of bottom gates, and the first restoring transistor T8 in this embodiment of the present application includes a bottom gate T8G1 and a top gate T8G2, which need to be distinguished.

The display panel provided in the embodiments of the present application is described in detail above. The principles and embodiments of the present application are described in detail herein. The description of the embodiments is merely intended to help understand the method and core ideas of the present application. At the same time, a person skilled in the art may make changes in the specific embodiments and application scope according to the idea of the present application. In conclusion, the content of the specification should not be construed as a limitation to the present application.

What is claimed is:

1. A display panel, wherein the display panel comprises a plurality of light-emitting elements disposed in an array and a pixel circuit driving the light-emitting element to emit a light, a first electrode of the light-emitting element is electrically connected to a first power source, a second electrode of the light-emitting element is electrically connected to a second power source, the pixel circuit is coupled between the first power source and the first electrode of the light-emitting element, and the pixel circuit comprises:

a driving transistor, wherein a gate electrode of the driving transistor is electrically connected to a first node, a source electrode of the driving transistor is electrically connected to a second node, a drain electrode of the driving transistor is electrically connected to a third node, and the first electrode of the light-emitting element is electrically connected to the first power source through the driving transistor;

a data writing transistor, wherein a gate electrode of the data writing transistor is electrically connected to a first scanning line, a source electrode of the data writing transistor is electrically connected to a data line, and a drain electrode of the data writing transistor is electrically connected to the second node;

a storage capacitor comprising a first capacitor electrode and a second capacitor electrode, wherein the first capacitor electrode is electrically connected to the first power source and the second capacitor electrode is electrically connected to the first node;

a first restoring transistor, wherein a gate electrode of the first restoring transistor is electrically connected to a second scanning line, a source electrode of the first restoring transistor is electrically connected to the first node, and a drain electrode of the first restoring transistor is electrically connected to a first restoring signal source;

a compensation transistor, wherein a gate electrode of the compensation transistor is electrically connected to the first scanning line, a source electrode of the compensation transistor is electrically connected to the third node, a drain electrode of the compensation transistor is electrically connected to the drain electrode of the first restoring transistor; and a second restoring transistor, wherein a gate electrode of the second restoring transistor is electrically connected to a third scanning line, a source electrode of the second restoring transistor is electrically connected to the drain electrode of the first restoring transistor, and a drain electrode of the second restoring transistor is electrically connected to the first restoring signal source;

wherein the first restoring transistor is an oxide transistor, the driving transistor and the data writing transistor are polysilicon transistors, and the compensation transistor and the second restoring transistor are polysilicon transistors.

2. The display panel according to claim 1, wherein the second restoring transistor and the compensation transistor are a single gate structure.

3. The display panel according to claim 1, wherein the display panel comprises a substrate, a first active layer, a first metal layer, a second metal layer, a second active layer, and a third metal layer laminated from a bottom to a top;

the first active layer forms an active layer of a polysilicon transistor, and the second active layer forms an active layer of an oxide transistor;

the first metal layer forms a gate electrode of the polysilicon transistor, and the second metal layer forms a first gate electrode of the oxide transistor;

wherein an overlapping region is defined by an orthographic projection of the first gate electrode of the oxide transistor on the substrate and an orthographic projection of the active layer of the oxide transistor on the substrate; and wherein an overlapping region is defined by an orthographic projection of the gate electrode of the polysilicon transistor on the substrate and an orthographic projection of the active layer of the polysilicon transistor on the substrate.

4. The display panel according to claim 3, wherein the third metal layer forms a second gate electrode of the oxide transistor;

wherein an overlapping region is defined by an orthographic projection of the second gate electrode of the oxide transistor on the substrate and an orthographic projection of the active layer of the oxide transistor on the substrate, and the orthographic projections of the second gate electrode of the oxide transistor and the first gate electrode of the oxide transistor on the substrate at least partially overlap.

5. The display panel according to claim 1, wherein the pixel circuit further comprises:

a reset transistor, wherein a gate electrode of the reset transistor is electrically connected to the first scanning line, a source electrode of the reset transistor is electrically connected to a second restoring signal source, a drain electrode of the reset transistor is connected to the first electrode of the light-emitting element;

at first light-emitting control transistor, wherein a gate electrode of the first light-emitting control transistor is electrically connected to a light-emitting control signal line, a source electrode of the first light-emitting control transistor is electrically connected to the first power source, and a drain electrode of the first light-emitting control transistor is electrically connected to the second node; and a second light-emitting control transistor, wherein a gate electrode of the second light-emitting control transistor is electrically connected to the light-emitting control signal line, a source electrode of the second light-emitting control transistor is electrically connected to the third node, and a drain electrode of the second light-emitting control transistor is electrically connected to the first electrode of the light-emitting element.

6. The display panel according to claim 5, wherein the reset transistor, the first light-emitting control transistor, and the second light-emitting control transistor are all polysilicon transistors.

7. The display panel according to claim 6, wherein the polysilicon transistor is a P-type transistor, and the oxide transistor is an N-type transistor.

8. The display panel according to claim 5, wherein the first restoring signal source and the second restoring signal source are a same restoring signal source.

9. The display panel according to claim 1, wherein the first scanning line and the second scanning line are scanning lines of a current row, and the third scanning line is a scanning line of a previous row.

* * * * *